United States Patent [19]

Lane

[11] Patent Number: 4,478,812
[45] Date of Patent: Oct. 23, 1984

[54] PREPARATION OF MATERIALS

[75] Inventor: Edward S. Lane, Didcot, England

[73] Assignee: United Kingdom Atomic Energy Authority, London, England

[21] Appl. No.: 522,694

[22] Filed: Aug. 12, 1983

[30] Foreign Application Priority Data

Aug. 13, 1982 [GB] United Kingdom ............... 8223389

[51] Int. Cl.$^3$ ............................................. C01G 19/02
[52] U.S. Cl. ................................................... 423/618
[58] Field of Search ......................................... 423/618

[56] References Cited

U.S. PATENT DOCUMENTS

| | | | |
|---|---|---|---|
| 1,682,239 | 8/1928 | Patrick | 423/618 |
| 1,682,240 | 8/1928 | Patrick | 423/618 |
| 1,879,022 | 9/1932 | Barclay | 423/618 |
| 2,927,018 | 3/1960 | Redemann | 423/618 |
| 4,041,144 | 8/1977 | Obara et al. | 423/618 |
| 4,048,294 | 9/1977 | Gloskey et al. | 423/618 |

FOREIGN PATENT DOCUMENTS

| | | | |
|---|---|---|---|
| 333670 | 8/1930 | United Kingdom | 423/618 |
| 364663 | 1/1932 | United Kingdom | 423/618 |

*Primary Examiner*—John Doll
*Assistant Examiner*—Wayne A. Langel
*Attorney, Agent, or Firm*—Larson and Taylor

[57] ABSTRACT

The present invention relates to the preparation of materials and more particularly to the preparation of tin oxide materials.

Thus, the present invention provides a process for the preparation of a tin oxide material by a gel precipitation process which includes contacting together a metal stannate, an organic gelling agent comprising a salt of a polycarboxylic acid and an acidic precipitating agent to form a gel precipitate.

The gel precipitate may be treated further to provide the tin oxide material.

The tin oxide material may be tin oxide as such, or a mixed oxide material containing tin oxide and an oxide of another element.

13 Claims, No Drawings

PREPARATION OF MATERIALS

The present invention relates to the preparation of materials and more particularly to the preparation of tin oxide materials and precursors therefor.

According to one aspect of the present invention there is provided a process for the preparation of a precursor for a tin oxide material by a gel precipitation process which includes contacting together a metal stannate, an organic gelling agent comprising a salt of a polycarboxylic acid and an acidic precipitating agent to form a gel precipitate precursor for a tin oxide material.

The gel precipitate precursor may be subsequently treated to give a tin oxide material. Thus, for example, the gel precipitate precursor may be heated to give a tin oxide material.

In this Specification "tin oxide material" embraces tin oxide as such and mixed oxide materials containing tin oxide and an oxide of another element (e.g. mixed oxides of tin, tungsten, molybdenum and silica).

The metal stannate is preferably an alkali metal stannate such as sodium or potassium stannate.

The salt of a polycarboxylic acid may be, for example, the salt (such as sodium or potassium salt) of a polymeric carboxylic acid examples of which are polyacrylic acid, polymethacrylic acid and co-polymers of vinyl compounds containing carboxy groups (e.g. Carbopol resins).

By way of further example, the salt of a polycarboxylic acid may be a salt of a naturally occurring polycarboxylic acid such as alginic acid.

Any suitable acidic precipitating agent may be used. Examples of acidic precipitating agents are aqueous common mineral acids and aqueous organic acids such as aqueous acetic acid.

In certain circumstances nitric acid or acetic acid may be preferred to hydrochloric acid or sulphuric acid. Thus, hydrochloric acid may result in chloride ion contamination of the tin oxide material (e.g. chloride ions are known to be held tenaciously by hydrated tin oxides) and sulphuric acid may give rise to non-volatile residues.

It will be appreciated that a gel precipitation process is one in which an organic gelling agent is used.

British Patent Specifications Nos. 1 175 834, 1 231 385, 1 253 807, 1 313 750 and 1,363,532 relates to gel precipitation processes and reference may be made to these for information regarding such processes.

Gel precipitates may be treated to effect so-called "debonding" (i.e. removal of organic substances derived, for example, from the gelling agent) and if required heated to for a ceramic product. Generally, gel precipitates are washed and dried prior to debonding.

The metal stannate, organic gelling agent and acidic precipitating agent may be contacted together in any convenient manner.

Thus, in one embodiment the so-called "forward" gel precipitation may be used.

In this embodiment the metal stannate and the organic gelling agent comprising a salt of a polycarboxylic acid may be mixed together and subsequently contacted with the acidic precipitating agent.

In accordance with the immediately preceding embodiment a gel precipitate precursor can be formed in a selected physical configuration. Thus, for example, substantially spherical particles of gel precipitate precursor can be formed by forming a mixture of the metal stannate and the organic gelling agent into droplets and contacting the droplets with the acidic precipitating agent to gel the droplets to give particles of gel precipitate.

The particles of gel precipitate precursor may be subsequently treated to effect "debonding" and give substantially spherical particles of tin oxide material.

In another embodiment so-called "reverse" gel precipitation may be employed (e.g. an acidic precipitating agent may be added to a mixture comprising a stannate and an organic gelling agent).

By choosing the gel precipitation process and the form in which the stannate is gelled the physical configuration of the product can be determined so as to produce, for example, spherical particles, fibres or powders.

It is known, e.g. from BP No. 1 175 834 (UKAEA), that oxides of tungsten and molybdeum may be prepared from tungstates and molybdates respectively by use of an organic gelling agent which contains a plurality of hydroxyl groups. In the preparation of tin oxide materials from stannates however such gelling agents tend to suffer from disadvantages.

Thus, such hydroxyl organic gelling agents have been found unsuitable for use with stannates due to mutual incompatibility (e.g. polyvinyl alcohol and dextran are not sufficiently soluble in aqueous alkali metal stannate solutions to enable satisfactory reactions to be effected).

The present invention substantially overcomes or avoids these disadvantages and permits acidic gel precipitation to be effected with stannates.

As hereinbefore described the present invention may be used to produce mixed oxides. Thus, for example, tungstates or molybdates in addition to the stannate may be contacted with the organic gelling agent and the acidic precipitating agent to give a gel precipitate which can be further treated (e.g. by heating) to give a tin oxide material comprising mixed oxides of tin and molybdenum and tungsten. Similarly mixed oxides may include silica by use of a silicate in the gel precipitation process.

Gel precipitates in accordance with the present invention may be readily separated and washed. Also, gel precipitates in accordance with the present invention may be dewatered or dried, if required, by any suitable means. For example, such gel precipitates may be air-dried or dewatered by use of an organic liquid (e.g. by a process as disclosed in British Patent Specification No. 1 575 300 (UKAEA)). By way of further example, water may be removed from such gel precipitates by a process as disclosed in UK Patent Application No. 2 083 451 (UKAEA) or UK Patent Application No. 2 083 899 (UKAEA). The porosity of gel precipitates in accordance with the present invention and that of debonded products produced therefrom may be influenced by the choice of drying or dewatering process.

Reference may be made to British Patent Specification No. 1 575 300 and UK Patent Application Nos. 2,083,451 and 2 083 899 regarding the influence of various dewatering means upon the structure of gel precipitates.

Tin oxide materials prepared in accordance with the present invention may find application in, inter alia, the preparation of ceramic particles (e.g. for catalyst use) and in the preparation of ceramic coatings.

The present invention further provides a tin oxide material wherein prepared by a process in accordance with the invention.

The invention will now be further described by way of example only as follows:

EXAMPLE 1

Polyacrylic acid (4.0 gm, 25% solution; M.W. approximately 230,000) was stirred with flake sodium hydroxide (0.5 g) and water and added to a solution of sodium stannate (20 g) in water so that the total volume was 55 ml. This well mixed solution was added dropwise to a stirred mixture of equal volumes of concentrated nitric acid (S.G. 1.42) and water. White spheres of gel precipitate were formed which, after 15 minutes residence time, were separated, washed with water and dried in industrial methylated spirit. Organic matter was removed from the spheres by heating in air (at 500° C.) for 2 hours to give tan coloured stannic oxide with a surface area of 30.4 $m^2g^{-1}$.

EXAMPLE 2

Polyacrylic acid (10.0 gm, 25% solution; M.W. approximately 230,000) was stirred with flake sodium hydroxide (1.4 g) and water and added to a solution of sodim stannate (20 g) in water so that the total volume was 55 ml. This well mixed solution was added dropwise to a stirred mixture of concentrated nitric acid (S.G. 1.42) (150 ml) and water (300 ml). White spheres of gel precipitate were formed and allowed to remain in the acid for 15 minutes. The spheres were then washed in cold water and dried in air. When heated in air (400° C. for 3 hours) 19.6 g of cream coloured spheres were obtained.

EXAMPLE 3

Polyacrylic acid (10.0 g, 25% solution; M.W. approximately 230,000) was stirred with flake sodium hydroxide (1.4 g) and water and added to a solution of sodium silicate (10 g; about 12% $Na_2O$ and 30% $SiO_2$; S.G. 1.5) in water. Sodium stannate (20 g) dissolved in water was added and the mixture (72 ml) added dropwise into nitric acid (S.G. 1.42) diluted with an equal volume of water. White translucent spheres of gel precipitate were formed which were dried in air at room temperature to give gel spheres of silica and stannic acid.

I claim:

1. A process for the preparation of a precursor for a tin oxide material by a gel precipitation process which includes contacting together a metal stannate, an organic gelling agent comprising a salt of a polycarboxylic acid and an acidic precipitating agent to form a gel precipitate precursor for a tin oxide material.

2. A process as claimed in claim 1 wherein the metal stannate is an alkali metal stannate.

3. A process as claimed in claim 2 wherein the metal stannate is selected from the group consisting of sodium stannate and potassium stannate.

4. A process as claimed in claim 1 wherein the salt of a polycarboxylic acid is the salt of a polymeric carboxylic acid.

5. A process as claimed in claim 4 wherein the salt of the polymeric carboxylic acid is a salt of: polyacrylic acid, polymethacrylic acid or a co-polymer of vinyl compound containing carboxy groups.

6. A process as claimed in claim 1 wherein the salt of a polycarboxylic acid is a salt of a naturally occurring polycarboxylic acid.

7. A process as claimed in claim 6 wherein the salt of a naturally occurring polycarboxylic acid in a salt of alginic acid.

8. A process as claimed in claim 1 wherein the acidic precipitating agent is an aqueous mineral acid or an aqueous organic acid.

9. A process as claimed in claim 8 wherein the acidic precipitating agent is selected from the group consisting of aqueous nitric acid and aqueous acetic acid.

10. A process as claimed in claim 1 wherein a metal stannate and a salt of a polycarboxylic acid are mixed together and subsequently contacted with an acidic precipitating agent.

11. A process as claimed in claim 10 wherein spherical particles of gel precipitate precursor are formed by forming a mixture of metal stannate and organic gelling agent into droplets and contacting the droplets with acidic precipitating agent to gel the droplets to give particles of gel precipitate.

12. A process as claimed in claim 1 wherein the gel precipitate precursor is heated to give a tin oxide material.

13. A process as claimed in claim 12 wherein the composition of the gel precipitate precursor is such that after heating the tin oxide material comprises mixed oxides of tin and molybdenum oxide, or tin and tungsten oxides, or tin oxide and silica.

* * * * *